United States Patent [19]

Kamen et al.

[11] Patent Number: 5,570,716
[45] Date of Patent: Nov. 5, 1996

[54] INFLATION CONTROL SYSTEM

[75] Inventors: Dean L. Kamen, Bedford; Valentine Faust, Bow, both of N.H.

[73] Assignee: DEKA Products Limited Partnership, Manchester, N.H.

[21] Appl. No.: 289,089

[22] Filed: Aug. 11, 1994

Related U.S. Application Data

[62] Division of Ser. No. 184,638, Jan. 21, 1994, Pat. No. 5,447,286.

[51] Int. Cl.$^6$ .................... A47C 4/54; F16K 31/128
[52] U.S. Cl. .................... 137/223; 137/269; 137/596.16; 251/30.02; 297/284.6
[58] Field of Search ............... 137/223, 596.16, 137/883, 884, 269; 251/30.01, 30.02; 5/456; 297/284.6, DIG. 3

[56] References Cited

U.S. PATENT DOCUMENTS

| | | | |
|---|---|---|---|
| 2,365,650 | 12/1944 | Shaw et al. | 137/153 |
| 3,570,484 | 3/1971 | Steer | 128/214 |
| 3,648,726 | 3/1972 | Caparone et al. | 137/505.41 |
| 3,806,086 | 4/1974 | Cloyd | 251/149.7 |
| 3,831,629 | 8/1974 | Mackal et al. | 137/525 |
| 3,838,710 | 10/1974 | Reip | 137/596.15 |
| 3,867,732 | 2/1975 | Morrell | 5/349 |
| 3,948,289 | 4/1976 | Flynn | 137/494 |
| 4,190,286 | 2/1980 | Bentley | 297/284 |
| 4,231,287 | 11/1980 | Smiley | 92/94 |
| 4,340,083 | 7/1982 | Cummins | 137/499 |
| 4,465,100 | 8/1984 | Neff | 137/884 X |
| 4,467,252 | 8/1984 | Takeda et al. | 318/603 |
| 4,485,846 | 12/1984 | Neff | 137/884 X |
| 4,552,402 | 11/1985 | Huber et al. | 297/284 |
| 4,592,588 | 6/1986 | Isono et al. | 297/284.6 |
| 4,617,952 | 10/1986 | Fujiwara et al. | 137/85 |
| 4,641,698 | 2/1987 | Bitonti | 137/223 X |
| 4,655,505 | 4/1987 | Kashiwamura et al. | 297/284 |
| 4,683,916 | 8/1987 | Raines | 137/854 |
| 4,710,168 | 5/1986 | Schwab et al. | 604/99 |
| 4,787,071 | 11/1988 | Kreuter et al. | 367/140 |
| 4,858,883 | 8/1989 | Webster | 251/61.1 |
| 4,976,162 | 12/1990 | Kamen | 73/865.9 |
| 5,129,704 | 7/1992 | Kishi et al. | 297/284.6 X |
| 5,176,358 | 1/1993 | Bonne et al. | 257/30.02 X |
| 5,261,442 | 11/1993 | Kingsford et al. | 137/312 |

FOREIGN PATENT DOCUMENTS

| | | |
|---|---|---|
| 0235967 | 9/1987 | European Pat. Off. . |
| 792708 | 1/1936 | France . |
| 2522085 | 8/1983 | France . |
| 2536975 | 8/1984 | France . |
| 1802413 | 6/1969 | Germany . |
| 2746630 | 4/1979 | Germany . |
| 2912755 | 10/1980 | Germany . |
| 56-138024 | 10/1981 | Japan . |
| 58-206426 | 12/1983 | Japan . |
| 60-118528 | 8/1985 | Japan . |
| 60-154925 | 8/1985 | Japan . |
| 1429932 | 3/1976 | United Kingdom . |
| 2134223 | 8/1984 | United Kingdom . |
| WO90/13795 | 11/1990 | WIPO . |

*Primary Examiner*—John Rivell
*Attorney, Agent, or Firm*—Bromberg & Sunstein

[57] ABSTRACT

An inflation control system including a high flow valve is controlled by pilot air selectively delivered by a piezo vent valve. The high flow valve includes a pilot input, an outlet and a main air chamber fed with main supply air through a main air conduit. The high flow valve further includes a diaphragm with an upper web, a lower web, a cylindrical member connecting the upper and lower webs and an annular ridge extending radially out around the cylindrical member. A pilot air supply is connected by a pilot air conduit to the pilot input. A piezo pilot valve interposed on the pilot air conduct opens or closes to provide or prevent the pilot air to the high flow valve. The pilot air shifts the high flow valve from a closed to an open state. A vent valve connected to the pilot air conduit removes the pilot air to allow the high flow valve to close. The high flow valve, the pilot air conduit, the piezo pilot valve and the vent valve may all be provided on a single valve module interconnectible with other valve modules of the same design.

8 Claims, 2 Drawing Sheets

INFLATION CONTROL SYSTEM

This is a divisional of application Ser. No. 08/184,638 filed on Jan. 21, 1994 now U.S. Pat. No. 5,447,286.

This application is related to application Ser. No. 07/887,732, filed May 22, 1992 ("Quick Disconnect Valve") which is a continuation-in-part of application Ser. No. 748,341, filed Aug. 22, 1991, which is a continuation-in-part of application Ser. No. 674,813 (for Flow-Control Valve System), application Ser. No. 673,835 (for Constant Pressure Fluid Supply System), application Ser. No. 674,818 (for Fluid Management System with Auxiliary Dispensing Chamber), and application Ser. No. 673,834 (for Membrane-Based Rotary Peristaltic Pump), of which was filed Mar. 22, 1991, and each of which is a continuation-in-part of application Ser. No. 615,612 filed Nov. 19, 1990, (for Acoustic Volume Measurement with Fluid Management Capability), add application Ser. No. 614,806 filed Nov. 19, 1990 (for Integral Intravenous Fluid Delivery Device) which are continuations-in-part of application Ser. No. 523,801 filed May 15, 1990 (for a Valve System with Removable Fluid Interface) and application Ser. No. 345,387 filed May 1, 1989, issued Dec. 11, 1990, as U.S. Pat. No. 4,976,162 (for an Enhanced Pressure Measurement Flow Control System), which is a continuation-in-part of application Ser. No. 092,481 filed Sep. 3, 1987, issued as U.S. Pat. No. 4,826,482, which is a continuation-in-part of application Ser. No. 022,167 filed Mar. 5, 1987, issued as U.S. Pat. No. 4,808,161, and application Ser. No. 836,023 filed Mar. 4, 1986, issued as U.S. Pat. No. 4,778,451. These related applications are hereby incorporated herein by reference.

BACKGROUND OF THE INVENTION

The present invention is directed to a valve control system, particularly one adaptable for use in controlling the inflation and deflation of a comfort control air bag, such as a lumbar support bag in an automobile seat.

Conventional systems for controlling the inflation or deflation of a pressurized comfort control air bag in an automobile make use of solenoids. Such solenoid valves generally require a relatively large power to operate and make audible clicking noises when they switch. The solenoids when powered, create electromagnetic fields that can interfere with a cat's radio. Therefore, shielding is required. Furthermore, such valves are relatively heavy and take up additional space within the automobile.

SUMMARY OF THE INVENTION

The present invention is directed to a valve control system which makes use of electrically controlled piezo valves to control the delivery of pilot air that is used to control the state of a high flow valve connected to an outlet for use with a comfort control air bag, for example.

The inflation control system of the invention provides an input for connection to a main air pressure source. A main air conduit is connected to the input. A normally closed, air piloted, high flow air valve is connected between the main air conduit and an outlet. The high flow valve has a pilot input that is connected to a pilot air conduit. A piezo pilot valve and a vent valve are connected to the pilot input of the high flow valve through the pilot air conduit. The piezo pilot valve selectively connects the pilot input of the high flow valve to a pilot air supply. The vent valve is selectively opened to vent the pilot air conduit. Connection of the pilot input to the pilot air supply opens the high flow valve and connection to the vent allows the valve to return to a closed state.

The vent valve may also be a piezo valve. The two piezo valves and a high flow valve can be conveniently mounted in a module. Several such modules can be connected together to operate a plurality of air bags. One of the modules may be used for connection to a vent so that by opening the vented high flow valve and a high flow valve connected to a bag, the bag can be deflated.

The high flow valve of the invention includes a well with a bottom vent hole and an inner annular ridge. A diaphragm having an upper web, a lower web and a cylindrical member connecting the upper and lower webs is located within the well. The lower web forms an airtight seal above the bottom vent hole. An annular ridge projecting radially out from the cylindrical member forms a seal against the inner annular ridge of the well when the valve is in a closed state. A main air supply port opens into the well between the lower web and the inner annular ridge. An outlet is connected to the well above the inner annular ridge. The upper web forms an airtight seal with the well above the outlet. Application of a sufficient pilot air pressure above the diaphragm moves the diaphragm to separate the annular ridge of the diaphragm from the inner annular ridge of the well permitting open fluid communication between the supply port and the outlet.

Piezo valves advantageously operate quietly and require very low power to operate. The high flow valve can open even if three times the pilot air pressure is fed back through the outlets from an air bag for example.

Other objects and advantages of the invention will become apparent during the following description of the invention taken in conjunction with the drawings.

DETAILED DESCRIPTION OF THE PREFERRED EMBODIMENTS

Figure 1:
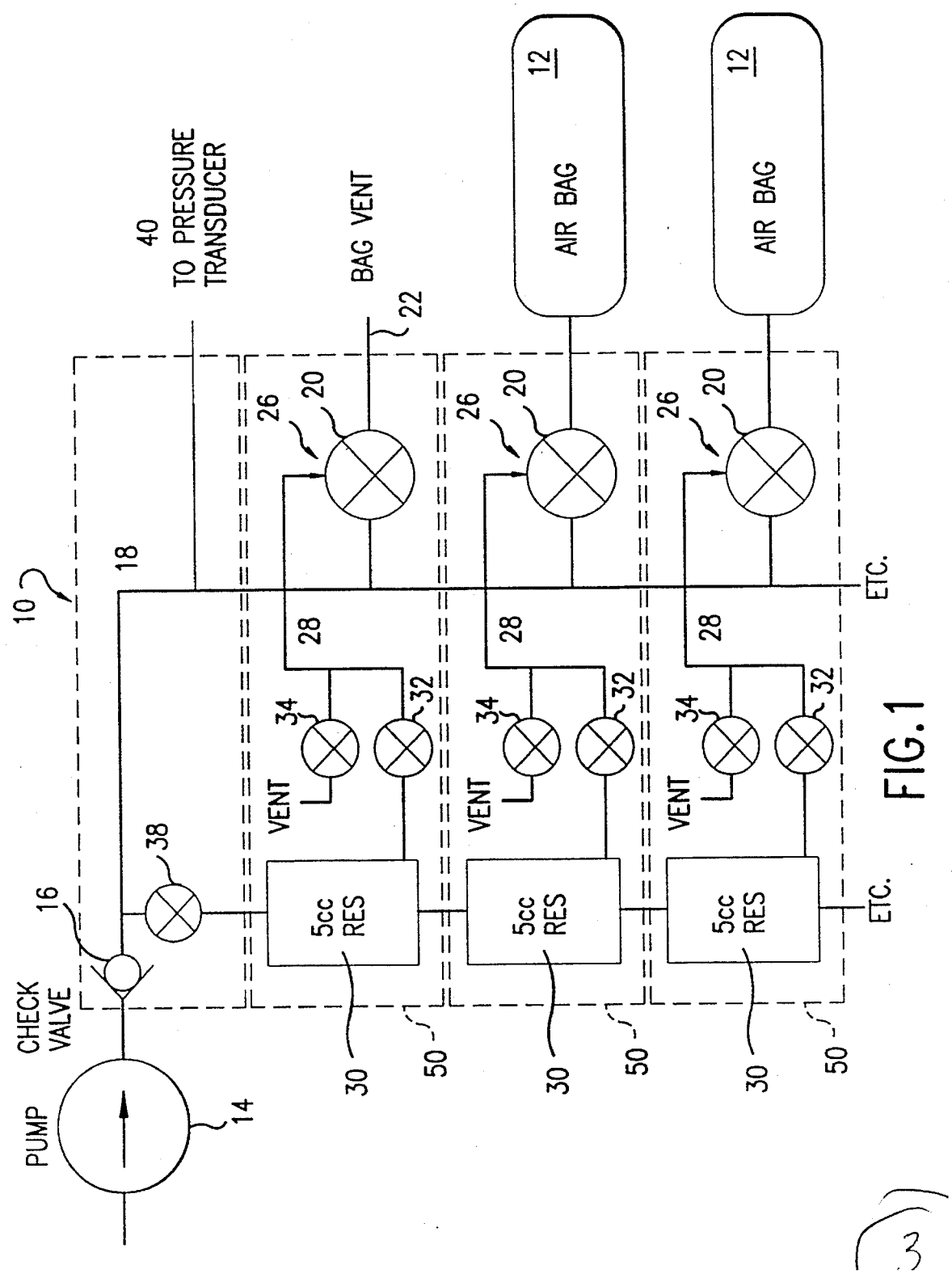
FIG. 1 is a schematic drawing of an inflation control system of the present invention.

Referring now to the drawings, an inflation control system 10 of the invention is shown in schematic form in FIG. 1. The inflation control system may be used to control the inflation and deflation of one or more bags of air 12. These bags 12 may be used in any of a number of applications. For example, comfort control air bags, such as lumbar support air bags inserted in the back support portion of a seat in an automobile is one possible application for the present invention. A main air pressure source, such as an air pump 14, is used as the supply of air for filling the bags 12. The main air pressure of the presently preferred embodiment is about 2 psi. A check valve 16 acts as a one-way valve between the pump 14 and a main air conduit 18. The check valve 16 permits the pump 14 to supply air into the main conduit 18 while preventing air in the main conduit from escaping. Each air bag 12 is connected to a normally closed, air piloted, high flow air valve 20. The high flow valves 20 are connected between the main air conduit 18 and the air bags 12. When a high flow valve 20 is open, air from the main air conduit 18 flows into the air bag 12 associated with that valve. When the high flow valve 20 is closed, the outlet from the valve to the air bag 12 is shut off. Air will then be prevented from entering or leaving the air bag 12. One high flow valve 20 is also provided with its outlet connected to a vent 22. By opening the high flow valve 20 connected to the vent 22, air may escape from the main air conduit 18. Any high flow valve connected to an air bag 12 that is also open when the valve associated with the vent is open, will have its associated air bag deflate.

In accordance with an embodiment of the invention, the high flow valves 20 are controlled through a pilot air inlet. Each high flow valve 20 has a pilot air inlet 26 that is connected to a pilot air conduit 28. A pilot air supply may be maintained as a reservoir 30 of pressurized air. By providing a pilot air supply separate from the main air pressure source, pilot valves can be operated even when the main air is being vented to the vent 22. Advantageously, the flow of pilot air is controlled by a piezo pilot valve 32. A relatively low power electrical signal is all that is required to switch the piezo pilot valve 32 between open and closed. A vent valve 34 is used in each pilot air conduit 28 for selectively controlling an opening of the conduit 28 to a vent 36. The vent valve may also be a piezo valve. With the vent valve 34 open, pilot air escapes through the vent and the high flow valve associated with that pilot air conduit switches to a closed state.

In order to open a high flow valve 20, sufficient pressure must be provided by the pilot air in the conduit 28 to shift the valve to an open state. This is accomplished by closing the vent valve 34 and opening the piezo pilot valve 32.

A pressure transducer 40 may be connected to the main air conduit 18 to monitor the air pressure in the main air conduit and provide an electrical signal back to the control panel of the system indicative of how the system is operating. The pressure transducer 40 may also be used to provide a signal to the pump 14 to maintain an appropriate air pressure in the main air conduit 18.

The pilot air reservoir 30 is arranged so that it may be replenished by the air pump 14 through a valve 38. The valve 38 may also be a piezo valve. The system may operate such that the pump 14 refills the pilot air reservoir whenever the pump is turned on. Alternatively, the pressure in the pilot air reservoir may be monitored to determine whether it is above a predetermined threshold. In accordance with the presently preferred embodiment, the pilot air reservoir is pressurized to about the same pressure as the main air, about 2 psi. A pressure transducer (not shown) could be added to the system to monitor the pilot air. Alternatively, piezo valve 38 could be used to monitor the pressure in the pilot air conduit. A piezo valve includes a piezo bimorph that responds to a mechanical stress such as the air pressure from the pilot air conduit, by creating an electrical signal. Thus, the piezo valve itself may be used to monitor the pressure and control replenishment of the pilot air reservoir.

Figure 2:
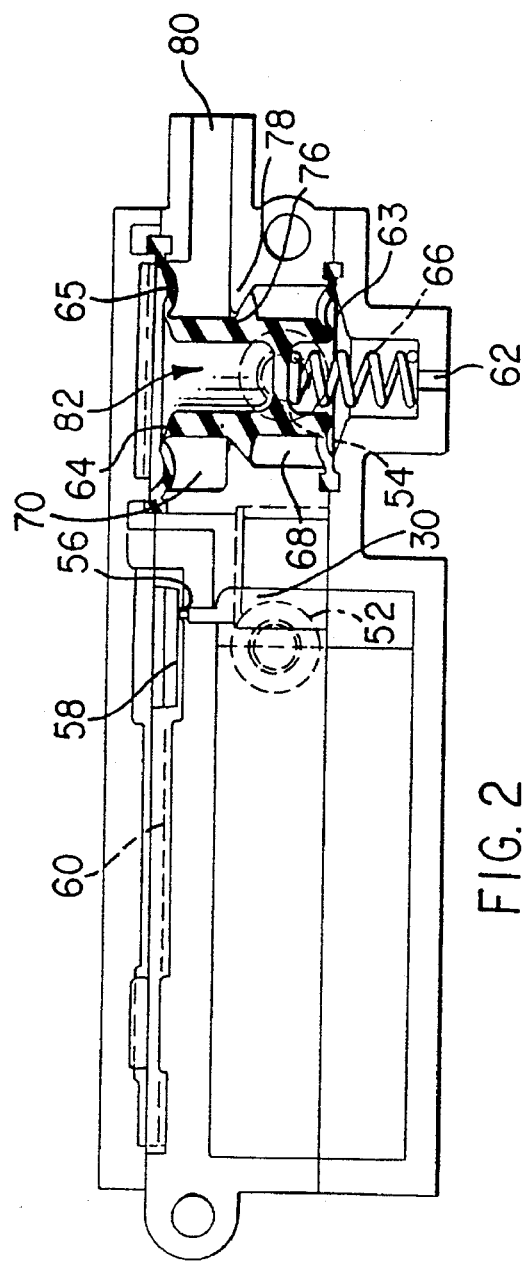
FIG. 2 is a side cross-sectional view of an inflation control module for use in the system of FIG. 1.
Figure 3:
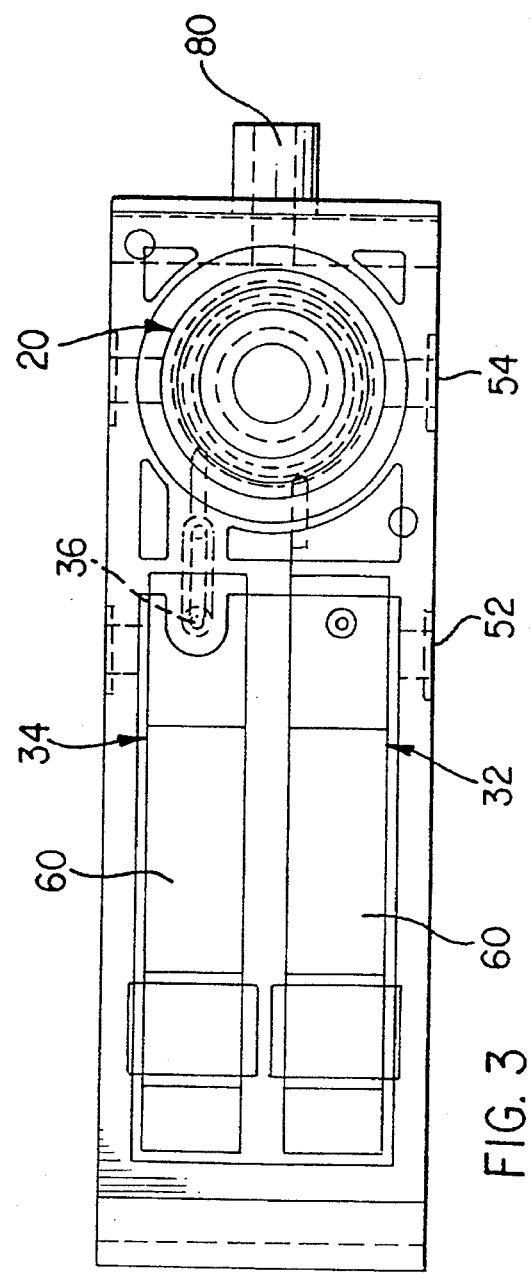
FIG. 3 is a plan view of the module of FIG. 2.

The inflation control system of an embodiment of the invention can advantageously be made out of a series of modules 50. Each module may be provided with one high flow valve 20, a pilot air conduit 28, a piezo pilot valve 32 and a piezo vent valve 36. The module can be described in greater detail with reference to FIGS. 2 and 3. Each module 50 can be packaged in a rectangular housing. The housing of each module may be made of a hard plastic. On the two opposed long sides of each module, there may be located two ports, a pilot air port 52 for connection to a pilot air reservoir and a main air port 54 for connection to a main air pressure source. The ports are located in the same location on both sides of each module so that the modules can be connected together and the ports may engage one another so that the pilot air conduit and main air conduit are continuous from one module to the next. By connecting the modules together, the pilot air conduit and main air conduit are each formed into manifolds for providing their respective air supplies to each of the modules. Moreover, the modules 50 are manufactured identically making them easy to stock and easy to replace.

The pilot air travels through a passage or chamber within the shell of the module. The module includes an open ended hollow cone 56 sticking out above the pilot air reservoir to provide a very small outlet for pilot air to escape into the piezo valve 32. The shell of the module is preferably made by injection molding two halves and ultrasonically welding them together. The outlet of the hollow cone 56 is covered by a sealing pad 58. The outlet of the hollow cone is made small to reduce the force from the pilot air upon the piezo bimorph and to form a more secure seal with the sealing pad. The sealing pad 58 is mounted on the front end of a piezo bimorph 60. The sealing pad is made of a substance such as silicone rubber. The piezo bimorph 60 is cantilevered over the hollow cone and is fixed in place at its rear end. Electrode terminals are attached at the rear end of the bimorph. An electric signal can be applied to the piezo bimorph 60 causing it to bend, thereby lifting the sealing pad 58 off of the outlet of the hollow cone 56. Pilot air passes out through the hollow cone and into a passageway leading into the pilot input of the high flow valve 20.

The high flow valve 20 is arranged within a circular well. At the bottom of the well, there is a vent 62 that is always open. The vent 62 permits movement of a diaphragm 69 up and down within the well of the valve. A spring 66 is inserted between the bottom of the well and the diaphragm 64. The spring 66 biases the diaphragm in a normally closed state. The diaphragm 64 divides the valve into two chambers, a main air chamber 68 and an outlet chamber 70. The diaphragm 64 includes a flexible lower web 63 affixed to the well above the spring 66 closing off the vent 62 from the main air chamber 68. There is no fluid communication between the vent 62 and the main air chamber 68. The diaphragm 64 includes a cylinder connecting the lower web 63 to an upper web 65. The upper web 65 provides an airtight seal on the well above the outlet chamber 70. Protruding radially outward from the circular cylindrical diaphragm is an annular ridge 76. The ridge 76 engages a corresponding annular ridge 78 protruding in from the wall of the well. The spring 66 biases the diaphragm up such that the outer annular ridge 76 seals the main air chamber against the inward protruding ridge 78 of the well. The inward protruding ridge 78 is located on the well below the outlet chamber 70 and above the main air supply port 54. An outlet 80 is in fluid communication with the outlet chamber 70. The outlet chamber 70 is sealed off from the pilot chamber 82 above the diaphragm by the upper web 65. The diaphragm 64 is an integral piece made of a flexible material such as silicone.

In addition to bias from the spring 66, the high flow valve is kept in a normally closed state by air pressure fed back through the outlet 80 against the upper web 65. This is countered by air pressure from the main air supply against the lower web 63. The cylinder portion of the diaphragm valve serves to reduce the available area of the upper and lower webs to reduce the forces exerted thereon by the outlet chamber air and the main air. It is desirable to balance these available areas along with the available area of the annular diaphragm ridge 76 and the force of the bias spring 66 so that the high flow valve can be opened by the two psi. pilot air even if three times that pressure is exerted back through the outlet 80. If a person leans or sits against a comfort control air bag, the pressure in the bag and hence the pressure exerted back through the outlet 80 is increased. The high flow bag must be able to operate even under these conditions. The dimensions of a presently preferred valve capable of opening in response to 2 psi. pilot air despite a 6 psi backpressure in the outlet chamber 70 are a pilot air chamber of 0.498 inch diameter, a diaphragm cylinder portion having 0.243 inch diameter above the annular ridge 76 and a 0.233 inch diameter below the annular ridge, an inward annular ridge 78 having a diameter of 0.320 inch, and a well diameter of 0.350 below the inward annular ridge. The diameter of the diaphragm's annular ridge 76 is smaller than the diameter of the well below the inward annular ridge 78 so that there is no rubbing when the high flow valve changes state.

When the piezo pilot valve opens, pilot air rushes into the pilot air chamber 82 above the diaphragm 64. When the force from the pilot air is sufficient, the diaphragm is pushed downward opening the seal between the annular ridge 76 and the inward annular ridge 78. The pilot air pressure is spread over the entire cross-sectional area of the web. This applied force must exceed that of the spring 66 and the net upward force applied by the main air and the outlet chamber air on the diaphragm. Main air can then flow through the outlet 80. Outlet 80 may be connected to an air bag 12 or may simply be vented for use in deflating an air bag.

The module 50 also includes a piezo vent valve 34. The piezo vent valve 34 operates on a vent 36 in the top of the rectangular module shell. The sealing pad 58 on the bimorph of the vent valve 34 is arranged on top of the valve so as to close off the vent 36. The vent 36 is forced by an open ended hollow cone. An electric signal to the bimorph in the piezo vent valve 34 is capable of causing the bimorph to bend away from the vent so that pilot air in the pilot air chamber above the high flow valve 20 can escape to the atmosphere through the vent 36. The spring 66 of the high flow valve then rebiases the diaphragm into a closed state. In order to open the high flow valve 20, the piezo vent valve 34 must be closed over the vent 36 and the piezo vent valve 32 must open to allow the pilot air into the pilot air chamber.

Of course, it should be understood that various changes and modifications to the preferred embodiments described will be apparent to those skilled in the art. For example, the orientation, arrangement and size of each of the valves with respect to one another and of the diaphragms and in the valves may be changed into different configurations and orientations. These and other changes can be made without departing from the spirit and the scope of the invention and without diminishing its attendant advantages. It is, therefore, intended that such changes and modifications be covered by the following claims.

We claim:

1. An inflation control system comprising:
   a main air supply;
   a pilot air supply;
   three modules, each module having
      a main outlet;
      a main inlet, wherein the main inlet for one of the modules is attached to the main air supply, and the main inlet for each of the remaining two modules is attached to the main outlet of another module;
      a pilot outlet;
      a pilot inlet, wherein the pilot inlet for one of the modules is attached to the pilot air supply, and the pilot inlet for each of the remaining two modules is attached to the pilot outlet of another module;
      a main air conduit portion providing fluid communication between the main inlet and the main outlet;
      a pilot air conduit portion providing fluid communication between the pilot inlet and the pilot outlet;
      a high-flow valve having (i) a pilot port and (ii) a high-flow outlet, the high-flow valve being in fluid communication with the main conduit portion, the high-flow valve having an open state in which the main air conduit portion is in fluid communication with the high-flow outlet and a closed state in which fluid communication between the main conduit portion and the high-flow outlet is disrupted;
      a pilot valve disposed between the pilot air conduit portion and the pilot port, the pilot valve having an open state in which the pilot air conduit portion is in fluid communication with the pilot port and a closed state in which fluid communication between the pilot air conduit portion and the pilot port is disrupted;
      a vent valve connected to the pilot port, the vent valve having an open state and a closed state, wherein, when the vent valve is in its open state, the high-flow valve is urged into its closed state, and, when the pilot valve is in its open state and the vent valve is in its closed state, the high-flow valve is urged into its open state;
   wherein the modules are adapted to be interchangeable with each other;
   wherein the high-flow outlet of one of the modules is attached to a vent, and the high-flow outlets of each of the remaining two modules is connected to an inflatable bag;
   wherein the modules are arranged so that the pilot air conduit portions form a pilot air conduit and so that the main air conduit portions form a main air conduit; and
   wherein air flows from the main air supply through the main air conduit to the bags to inflate the bags, and air flows from the bags through the main air conduit to the vent to deflate the bags; and
   means for switching each of the pilot valves and each of the vent valves between their open and closed states.

2. The inflation control system of claim 1, wherein each of the pilot valves comprises a piezo valve.

3. The inflation control system of claim 2, wherein each of the vent valves comprises a piezo valve.

4. The inflation control system of claim 1, wherein, in each of the modules, the high-flow valve includes means for shifting the high-flow valve into the open state when the pilot valve is opened and the vent valve is closed even with as much as three times the pressure being applied back through the high-flow outlet than being applied through the high-flow valve's pilot port.

5. The inflation control system of claim 4, further including in each of the modules a reservoir disposed in fluid communication with the module's pilot air conduit, the reservoir having sufficient volume for holding pilot air to permit operation of the pilot valve when the pilot air supply is disrupted.

6. The inflation control system of claim 1, wherein, in each of the modules, the pilot valves are placed into the open state by application of an electrical signal.

7. The inflation control system of claim 1, further including in each of the modules a reservoir disposed in fluid communication with the module's pilot air conduit portion, the reservoir having sufficient volume for holding pilot air to permit operation of the pilot valve when the pilot air supply is disrupted.

8. The inflation control system of claim 1, wherein each of the modules includes a housing having two opposed side walls and containing the high-flow valve, the pilot valve and the vent valve, and defining the main air conduit portion and the pilot air conduit portion;

the housing further defining the main air inlet and the main air outlet, each of the main air inlet and the main air outlet being located on different ones of the two opposed side walls and both of the main air inlet and main air outlet being aligned with each other on a line perpendicular to both of the two opposed side walls; and the housing further defining the pilot air inlet and the pilot air outlet, each of the pilot air inlet and the pilot air outlet being located on different ones of the two opposed side walls and both of the pilot air inlet and pilot air outlet being aligned with each other on a line perpendicular to both of the two opposed side walls.

* * * * *

UNITED STATES PATENT AND TRADEMARK OFFICE
CERTIFICATE OF CORRECTION

PATENT NO. : 5,570,716
DATED : November 5, 1996
INVENTOR(S) : Dean L. Kamen and Valentine Faust It is certified that error appears in the above-identified patent and that said Letters Patent is hereby corrected as shown below:

Column 6, line 55: insert --portion-- after "conduit"

Signed and Sealed this

Fifteenth Day of April, 1997

Attest:

BRUCE LEHMAN

Attesting Officer      Commissioner of Patents and Trademarks